(12) United States Patent
Viaro et al.

(10) Patent No.: US 7,579,963 B2
(45) Date of Patent: Aug. 25, 2009

(54) ELECTRONIC PROTECTION DEVICES FOR CIRCUIT-BREAKERS AND CORRESPONDING PROGRAMMING METHOD

(75) Inventors: Francesco Viaro, Albino (IT); Marco Stucchi, Osio Sotto (IT); Federico Gamba, Bergamo (IT)

(73) Assignee: ABB S.p.A., Milan (IT)

( * ) Notice: Subject to any disclaimer, the term of this patent is extended or adjusted under 35 U.S.C. 154(b) by 370 days.

(21) Appl. No.: 10/599,776

(22) PCT Filed: Apr. 5, 2005

(86) PCT No.: PCT/EP2005/003637

§ 371 (c)(1),
(2), (4) Date: Oct. 9, 2006

(87) PCT Pub. No.: WO2005/101604

PCT Pub. Date: Oct. 27, 2005

(65) Prior Publication Data

US 2007/0273546 A1  Nov. 29, 2007

(30) Foreign Application Priority Data

Apr. 19, 2004  (IT) .......................... MI2004A0761

(51) Int. Cl.
*G08C 19/22* (2006.01)

(52) U.S. Cl. ...................... 340/870.07; 361/62; 361/63; 361/65

(58) Field of Classification Search ............ 340/870.07, 340/870.11, 870.16; 361/79, 62, 63, 65, 361/67
See application file for complete search history.

(56) References Cited

U.S. PATENT DOCUMENTS

| | | | | | |
|---|---|---|---|---|---|
| 3,597,689 | A | * | 8/1971 | Ferrell .......................... | 455/46 |
| 3,932,735 | A | * | 1/1976 | Giras .......................... | 700/287 |
| 4,264,960 | A | * | 4/1981 | Gurr .......................... | 700/295 |
| 4,278,970 | A | * | 7/1981 | Streczyn et al. ............. | 340/599 |
| 4,308,511 | A | * | 12/1981 | Borona ........................ | 335/14 |
| 5,270,658 | A | * | 12/1993 | Epstein ....................... | 324/424 |
| 2002/0075616 | A1 | | 6/2002 | Montjean | |
| 2003/0006905 | A1 | | 1/2003 | Shieh et al. | |
| 2003/0151489 | A1 | | 8/2003 | Shbiro et al. | |

FOREIGN PATENT DOCUMENTS

| DE | 100 31 963 C1 | 2/2002 |
|---|---|---|
| WO | WO-02/45230 A1 | 6/2002 |

* cited by examiner

*Primary Examiner*—Albert K Wong
(74) *Attorney, Agent, or Firm*—Connolly Bove Lodge & Hutz LLP

(57) ABSTRACT

A protection device for circuit-breakers that comprises a wireless communication system for transmitting locally, to a dedicated computerized device, information corresponding to measurements of electrical quantities, to the setting of the parameters typical of the protection functions, or to diagnostics information corresponding to the electrical system, to the circuit-breaker or to the protection device itself.

20 Claims, 3 Drawing Sheets

ELECTRONIC PROTECTION DEVICES FOR CIRCUIT-BREAKERS AND CORRESPONDING PROGRAMMING METHOD

CROSS-REFERENCE TO RELATED APPLICATIONS

This application is a National Stage entry 35 U.S.C. 0371 of International Application PCT/EP2005/003637 filed on Apr. 5, 2005. International Application PCT/EP2005/003637 claims priority to Italian application MI2004A000761, filed on Apr. 19, 2004. The entire contents of each of these applications is incorporated herein by reference.

The present invention relates to a device and a method for programming and wireless dialogue for electronic protection devices of unipolar or multipolar circuit-breakers in an electrical system.

It is known that an automatic circuit-breaker for the protection of loads or electrical networks, hereinafter referred to briefly as circuit-breaker, normally comprises devices for making and breaking the main contacts, devices for detecting the currents that traverse it, protection devices, and devices for automatic tripping.

Protection devices, hereinafter referred to briefly as relays, can normally be of a thermal, magnetic, or thermomagnetic type, or else of an electronic type. The present invention relates exclusively to applications with relays of an electronic type.

Said relays of an electronic type can provide various protection and warning functions, and the set of said functions may vary in number and complexity according to the models. In particular, the protection and warning functions of an electronic relay can be variously programmed within their own technical limits to adapt the overall behaviour of the circuit-breaker to the characteristics of the load to be protected and of the electrical system, as well as to render the warnings available in various ways. Said programming of the functions of an electronic relay is performed via a local programming interface operatively connected to the same relay.

There exist in the known art means for programming electronic relays that exploit interfaces of a traditional type (such as dip-switches, knobs, rotary switches), or else of a more advanced type, such as keyboards and alphanumeric or graphic displays, or again, remote means for programming and/or dialogue of a wired or wireless type that use purposely provided communication interfaces. The wireless communication interfaces (which typically exploit infrared or radio-frequency technologies) are divided into local interfaces, and remote interfaces. The programming systems present in the known art can finally provide, alongside the functions of data transmission, also functions of communication in the opposite direction (to obtain, for example, from the protection device identification or diagnostic data), the means equipped with this additional function being commonly referred to as dialogue systems. The communication between the relays of circuit-breakers and remote programming means typically occurs in precise sessions, defined by a limited interval of time, within which the pre-set information is transmitted and/or received in digital form.

Neglecting the evident limits of the solutions without any provision for remote programming, or solutions based upon wired communication networks, it may be noted that also amongst the wireless solutions experimented and adopted in practice none proves to be altogether satisfactory on account of numerous limits that will be examined hereinafter.

The first limit of wireless communication based upon infrared interfaces coincides with the technical limits proper to this technology, which in fact enables setting-up of transmission and/or reception only along unencumbered paths and above all pre-set and rectilinear paths, thus requiring the precise pointing by the remote interface of the local interface corresponding to the protection device to be programmed or with which to communicate, and said step of pointing must evidently be kept up to completion of the connection session. Infrared systems moreover present technical limits due to the tendentially limited range of the corresponding signal, which results in the operator having to position himself at an extremely short distance (typically within 2 meters) from the corresponding protection device.

Another limit that relates more in general to all known wireless solutions lies in the provision for establishing an exclusive connection session (whether this be for programming or dialogue) with the relay of just one circuit-breaker. When it is desired to program or dialogue with a number of relays present in one and the same system, it is therefore necessary to operate in distinct successive sessions; in particular, there is not available in the current state of the art a programming or dialogue system capable of setting up, in a single operation, multiple sessions with a plurality of protection devices.

SUMMARY

On the basis of the above considerations, the primary task of the present invention is to provide a device and a method for programming and wireless dialogue for electronic relays of circuit-breakers that will enable the drawbacks referred to above to be overcome, improving substantially the functionality and overall potential of a system of programming and dialogue. In the framework of this task, the main purpose of the present invention is to provide a completely wireless device and method for programming and dialogue (i.e., without the presence of any wires for digital transmission of data, even between one circuit-breaker and another) based upon the use of portable remote interfaces suitable both for receiving and for transmitting information from and to one or more protection units, in single or multiple sessions.

Another purpose of the present invention is to obtain the device and the method referred to above using remote wireless communication interfaces that are not necessarily dedicated, such as PC, PDA or cell phones of a commercially available type, provided that they are equipped with an adequate wireless communication system (for example, of the Bluetooth, WiFi, or Zigbee type) and a special software.

A further purpose of the present invention is to obtain the device and method referred to above using pre-existing electronic relays of any type, provided that they are pre-arranged for remote connection, for example via serial ports, conveniently exploited for adapting local communication interfaces thereto.

Yet another purpose of the present invention is to provide an electronic protection device for low-voltage circuit-breakers which, as compared to the solutions of a known type, will enable transmission of information and which can be set in a simple and technically accurate way via communication with compatible remote wireless units. This particular feature enables optimal exploitation of all the potential of the various relays installed, even though they may be different from one another, by using a single programming interface that is at the same time simple, complete and reliable, without having to intervene but without even having to know specifically the characteristics of the local programming interfaces normally associated to each relay.

A further purpose of the present invention is to provide a device and a method for programming and wireless dialogue for electronic relays for circuit-breakers that will enable orderly detection and mapping or inventory of all the automatic circuit-breakers equipped with adequate protection units that may be present in a given range. Said range, typically in the region of 10 meters, may conveniently comprise the set of all the circuit-breakers variously installed, for example, in an electric switchboard or in an electric cabinet.

Yet a further purpose of the present invention is to provide a wireless dialogue and programming method for protection devices for circuit-breakers that will enable reception from the protection devices of the circuit-breakers detected of further records of information (such as data on the type of relay, the type of circuit-breaker, and the type of load, and their current settings, and other current significant data or statistics corresponding to the conditions of the protection devices themselves, of the circuit-breaker and of the loads associated thereto, including the absorption levels and the functions of diagnostics). Said information, coming from the various relays of the circuit-breakers, can then be used for numerous subsequent operations of calculation, corrective actions, processing and possibly re-programming typical of the management of the electrical system.

Yet another purpose of the present invention is to provide a method of communication for relays of circuit-breakers that will enable transmission to the protection devices of the circuit-breakers detected of data that may be useful for carrying out programming of their parameters. Said transmission can be made both in distinct sessions to the relay of an individual chosen circuit-breaker, and in multiple sessions, in such a way that a plurality of chosen relays will be programmed, with the possibility of assigning to each protection device the specific parameters chosen individually.

Another purpose of the present invention is to provide a device that will afford the possibility of managing a number of levels of access, enabling different operators to operate in the system according to their level of authorization.

The above task and the above purposes, as well as others that will appear more clearly from what follows, are achieved by a protection device as defined in the attached Claim 1.

BRIEF DESCRIPTION OF THE DRAWINGS

Further characteristics and advantages will emerge more clearly from the description of preferred but non-exclusive embodiments of a device and method for programming and dialogue according to the invention, illustrated by way of indicative and non-limiting example with the aid of the annexed drawings in which.

DESCRIPTION

Figure 1:
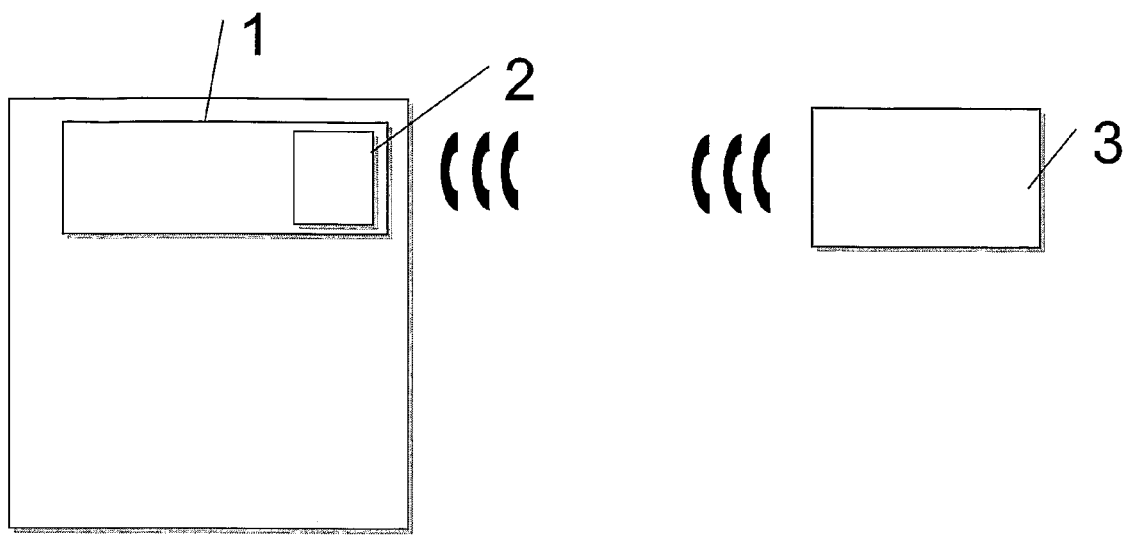
FIG. 1 is a block diagram illustrating an automatic circuit-breaker, the corresponding electronic protection device, the corresponding local wireless digital communication interface and a device for dialogue and remote programming of a portable type.

With reference to the figures listed above, the protection device 1 for circuit-breakers 100, and in particular for low-voltage automatic circuit-breakers, comprises a wireless communication system 2. Said wireless communication system or module 2 is designed to transmit locally, to a dedicated computerized device 3, information corresponding to measurements of electrical quantities, to the setting of the parameters typical of the protection functions, or to diagnostics information corresponding to the electrical system, to the circuit-breaker, or to the protection device itself.

In the embodiment of FIG. 1, the dedicated computerized device (3), which is a portable device that may even be of a standard type, such as for example a PC, PDA, or cell phone, is set at a convenient distance so as to set up a connection with the protection device 1 via the module 2.

Figure 2:
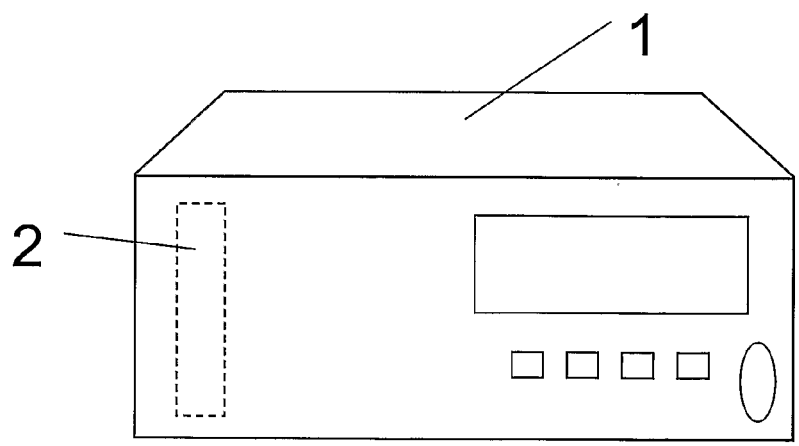
FIG. 2 is the block diagram of a first possible embodiment, illustrating a local wireless digital communication interface integrated in the electronic protection device.

According to a first embodiment of the device according to the invention, represented in FIG. 2, the wireless communication module 2 is an integral part of the protection device 1. By the term "integral part" is meant both the case where the module 2 forms part of the electronic circuit of the protection device 1, and the case where the wireless communication system 2 is made on a module stand-alone but permanently connected to the main electronic circuit.

Figure 3:
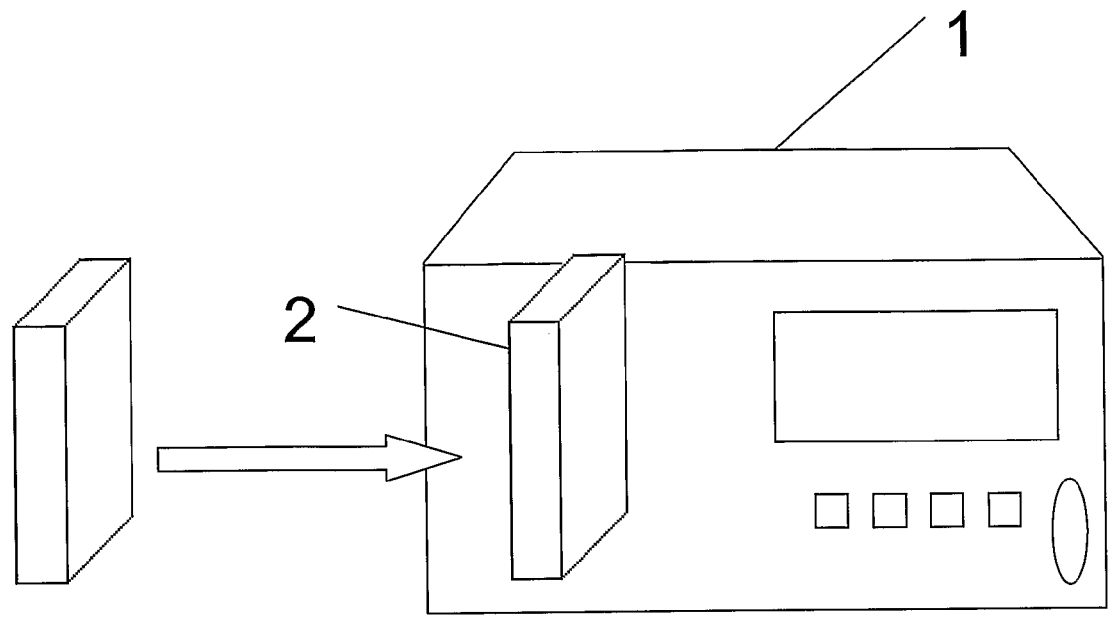
FIG. 3, corresponding to a second possible embodiment, is a block diagram of an electronic protection device and of the corresponding local wireless digital communication interface connected as accessory inside the electronic protection device.

With reference to FIG. 3, illustrated therein is an embodiment of the protection device 1 according to the invention, alternative to the previous one. According to this embodiment, the wireless communication system 2 is an accessory of the protection device 1 and is made on a module independent of said protection device 1. Said module can be connected to the device 1 at a later date via an appropriate connection already provided for the purpose and is physically integrated in the circuit-breaker. According to this embodiment, the local wireless interface of the relay may typically comprise, for example: an electronic card to be inserted in the relay, from which it receives the supply and with which it exchanges data; warning LEDs that are set on the outside of the relay and represent different quantities or activities in progress (power, serial reception in progress, serial transmission in progress, Bluetooth session in progress); and Bluetooth digital radio-transceiver system and antenna not visible on the outside.

Figure 4A:
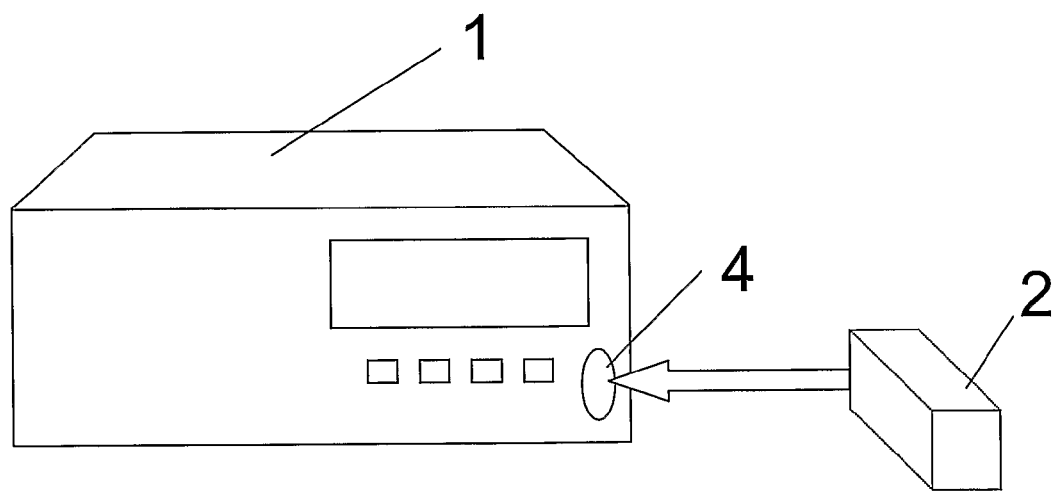
FIG. 4, corresponding to a third possible embodiment, is a block diagram of an electronic protection device and of the corresponding local wireless digital communication interface connected externally to the relay via a digital communication port.
Figure 4B:
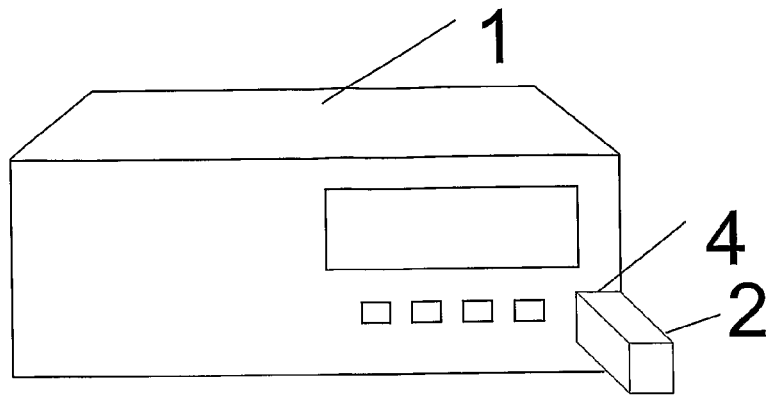

A further alternative embodiment of the protection device 1 according to the invention is represented in FIG. 4. This further solution is characterized in that the wireless communication system 2 is an accessory of the protection device located outside the circuit-breaker. The communication module 2 can be connected to the protection device 1 at any moment via a service communication port 4 set on the front of the device 1, and hence it is not physically integrated in the circuit-breaker. In this case the module 2 can be, but not necessarily is, equipped with a supply system of its own, constituted for example by batteries. In this case, the module 2 will be connected preferably, but not necessarily, for just the duration of the communication session. Instead, in the case of permanent connection, for the purpose of limiting the consumption and increasing the duration of the batteries, the communication may be activated via a push-button, set in a convenient position on the module 2 itself, without the device verifying continually or periodically the presence of a remote host communication interface (dedicated device, PC, PDA, or cell phone, etc.). It is important to emphasize that this embodiment enables electronic protection units for automatic circuit-breakers equipped with at least one generic digital communication port (such as, for example, a serial port, a parallel port, USB, etc.) to be rendered compatible with the method of the invention.

Figure 5:
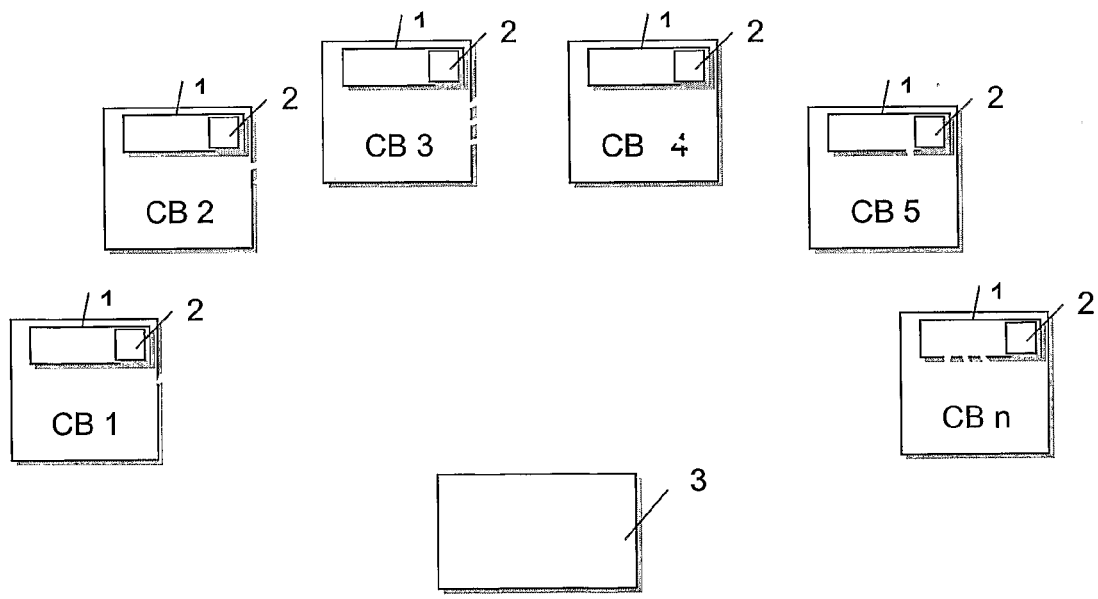
FIG. 5, which applies to each of the three embodiments described above, is a block diagram that highlights the connection, during a typical dialogue session, between a remote programming and dialogue device, and a number of assemblies each formed by a protection device (equipped with local wireless interface) and by the corresponding circuit-breaker.

With reference to FIG. 5, represented therein is a form of use of the protection device 1 according to the invention. According to this solution, a set of devices 1 can connect up simultaneously to the portable device 3; consequently, the device 3 must allow ease of identification and subsequent selection of the individual preferential device 1 with which the user wishes to open a communication session.

The wireless communication system can be activated automatically at the approach of any portable dedicated computerized device 3 in the area of transmission of the module 2, said computerized device being enabled for connection to the protection device itself. Alternatively, the wireless communication system is activated via a push-button set in an appropriate point of the module 2, without the device verifying continually or periodically the presence of a dedicated computerized device 3.

As mentioned previously, the transmission can be made either in distinct sessions to the relay of an individual chosen circuit-breaker or in multiple sessions, in such a way that a plurality of chosen relays are programmed, with the possibility of assigning to each protection device the specific parameters individually chosen. The latter function represents an absolute technical novelty, and opens up a potentially infinite series of new developments. The first of these possible developments regards the possibility of carrying out, at different times, detection and programming of the relays, so enabling the operator to go away and to set the calibration data anytime or anywhere, also with the aid of supplementary tools, such as computers or diagrams of the electrical system present in areas other than the electric cabinets. Another development described hereinafter relates to the possibility of carrying out detection, transmitting the data, obtained, for example, via cell phone, to a programming station, to obtain from the latter the calibration data and finally carry out, in one or more sessions, the programming of the relays. From a practical standpoint, using the devices according to the invention, the programming can occur as described in what follows. As is known, Bluetooth typically exploits ports of two types, namely, master and slave. The master ports are used for the remote interfaces; the slave ports are used for the local interfaces. Typically in a session there is communication (transceiving) between a master port and at least one slave port, but not between slave ports. According to a preferred embodiment, a dedicated computerized device constituted, for example, by a palmtop computer contains a software that enables investigation via radio on the presence of slave ports and detection of the unique code and the customized code corresponding to each Bluetooth interface present in the range. The customized code normally contains basic information, such as the name of the manufacturer, the type of service implemented, and so forth.

Subsequently, the "true" communication channel is opened, which is a first communication session, in which the wireless communication modules 2 of the relays start sequentially to communicate with the respective relay and can then transmit to the dedicated remote computerized device farther conveniently programmable identification data (such as the exact name of the user, the type of circuit-breaker, the data of the current installation and of the last maintenance operation), as likewise further information. Said information data, whether current data or statistical data, can, for example, correspond to the types and conditions of: 1) the protection devices themselves; 2) the circuit-breaker and the loads associated thereto; 3) the absorption levels; and 4) the diagnostic functions. The software present in the dedicated computerized device enables orderly mapping of this information.

From this point on, the operator can enter the desired settings at any moment in the dedicated computerized device. As explained previously, this operation can occur immediately by using the software present in the palmtop, or else, since in this step the presence of the relays is not necessary, it can occur conveniently somewhere else, also using further computer means that can in turn dialogue with the dedicated computerized device via digital communication ports (serial, parallel, USB, Bluetooth, firewire, etc).

In subsequent sessions, which must be opened by re-positioning the dedicated computerized device in the proximity of the relays, the programming proper of the relays finally takes place. It has in practice been seen how the device according to the invention fulfils the pre-set task as well as the pre-set purposes. The protection device thus devised may undergo numerous modifications and variations, all falling within the scope of the inventive idea; in addition, all the items may be replaced by other technically equivalent ones. In practice, the materials, as well as the dimensions, may be any whatsoever, according to the requirements and the state of the prior art.

The invention claimed is:

1. A protection device for circuit-breakers, comprising a wireless communication system for transmitting locally to a dedicated computerized device, information corresponding to measurements of electrical quantities, to the setting of the parameters typical of the protection functions, or to diagnostics information corresponding to the electrical system, to the circuit-breaker, or to the protection device itself, wherein the transmission of said information comprises a plurality of sessions that may be distinct or multiple, said protection device being part of a plurality of protection devices that are programmable during said sessions, said protection device being assignable with specific parameters individually chosen during said sessions, said sessions comprising:
   a session of investigation of the presence of slave ports for communication;
   a further session, in which an initial communication session between a number of protection devices to a single dedicated computerized device is established;
   a further session, in which a choice for defining each time the active communication to a single protection device is made; and
   one or more further sessions, in which the programming of the protection devices takes place.

2. A protection device according to claim 1, wherein said dedicated computerized device is a PC, PDA or cell phone.

3. A protection device according to claim 1, wherein said wireless communication system is an integral part of the protection device itself.

4. A protection device according to claim 1, wherein said wireless communication system is an accessory module of said protection device.

5. A protection device according to claim 4, wherein said accessory module is inside the circuit-breaker itself.

6. A protection device according to claim 4, wherein said accessory module is outside the circuit-breaker itself.

7. A protection device according to claim 1, wherein said wireless communication system is activated automatically at the approach of any portable dedicated computerized device in the area of transmission, said computerized device being enabled for connection to the protection device itself.

8. A protection device according to claim 1, wherein said wireless communication system is activated via a push-button set in an appropriate point of the module, without the device verifying continually or periodically the presence of a dedicated computerized device.

9. A protection device according to claim 1, wherein the communication between said wireless communication system and said dedicated computerized device occurs according to hierarchical enabling protocols.

10. A protection device according to claim 1, wherein it transmits measurements corresponding to the electrical system and the parameters of the protection functions to devices dedicated for their display, which are set locally in the neighborhood of the protection device itself.

11. A circuit-breaker, in particular a low-voltage one, including a device according to claim 1.

12. A circuit-breaker, in particular a low-voltage one, including a device according claim 2.

13. A circuit-breaker, in particular a low-voltage one, including a device according claim 3.

14. A circuit-breaker, in particular a low-voltage one, including a device according claim 4.

15. A circuit-breaker, in particular a low-voltage one, including a device according claim 5.

16. A circuit-breaker, in particular a low-voltage one, including a device according claim 6.

17. A circuit-breaker, in particular a low-voltage one, including a device according claim 7.

18. A circuit-breaker, in particular a low-voltage one, including a device according claim 8.

19. A circuit-breaker, in particular a low-voltage one, including a device according claim 9.

20. A circuit-breaker, in particular a low-voltage one, including a device according claim 10.

* * * * *